(12) United States Patent
Togashi et al.

(10) Patent No.: US 7,495,885 B2
(45) Date of Patent: Feb. 24, 2009

(54) MULTILAYER CAPACITOR

(75) Inventors: Masaaki Togashi, Tokyo (JP); Takeshi Wada, Tokyo (JP)

(73) Assignee: TDI Corporation, Tokyo (JP)

( * ) Notice: Subject to any disclaimer, the term of this patent is extended or adjusted under 35 U.S.C. 154(b) by 0 days.

(21) Appl. No.: 12/007,829

(22) Filed: Jan. 16, 2008

(65) Prior Publication Data

US 2008/0180877 A1 Jul. 31, 2008

(30) Foreign Application Priority Data

Jan. 30, 2007 (JP) ............................. 2007-019667

(51) Int. Cl.
*H01G 4/228* (2006.01)
(52) U.S. Cl. .............. 361/306.3; 361/306.1; 361/306.2; 361/311; 361/313; 361/321.1
(58) Field of Classification Search ............ 361/306.3, 361/306.1, 306.2, 311–313, 302–305, 321.1, 361/321.2, 301.1, 301.2, 301.5
See application file for complete search history.

(56) References Cited

U.S. PATENT DOCUMENTS

| | | | | |
|---|---|---|---|---|
| 6,462,932 B1 * | 10/2002 | Naito et al. | .............. | 361/306.1 |
| 6,594,136 B2 * | 7/2003 | Kuroda et al. | ............ | 361/306.1 |
| 6,707,662 B2 * | 3/2004 | Waffenschmidt et al. | .... | 361/523 |
| 6,795,295 B2 * | 9/2004 | Murakami et al. | ....... | 361/306.3 |
| 7,149,071 B2 * | 12/2006 | Mosley | .................... | 361/306.3 |
| 7,369,395 B2 * | 5/2008 | Togashi | ...................... | 361/303 |

FOREIGN PATENT DOCUMENTS

JP         A 9-148174         6/1997

* cited by examiner

*Primary Examiner*—Nguyen T Ha
(74) *Attorney, Agent, or Firm*—Oliff & Berridge, PLC

(57) ABSTRACT

A multilayer capacitor has a capacitor element, inner electrodes arranged within the capacitor element, and first to fourth terminal electrodes. Electrode parts of the first to fourth terminal electrodes cover ridges formed between first and third side faces, first and fourth side faces, second and third side faces, and second and fourth side faces. The capacitor element has an element part. The element part is formed such as to overlap the electrode parts when seen in a second and a third directions and keep away from respective areas about the electrode parts when seen in a first direction.

6 Claims, 5 Drawing Sheets

(a)

(b)

(a)

(b)

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising an element body made of a dielectric material, a plurality of inner electrodes formed within the element body, and a plurality of terminal electrodes formed on the element body (see, for example, Japanese Patent Application Laid-Open No. 9-148174).

SUMMARY OF THE INVENTION

It is an object of the present invention to provide a multilayer capacitor which can suppress mechanical strains caused by the electrostrictive effect near terminal electrodes in an element body made of a dielectric material.

Meanwhile, when a voltage is applied to a multilayer capacitor equipped with an element body made of a dielectric material, there occurs a problem that a mechanical strain having a magnitude proportional to the applied voltage is caused in the element body because of the electrostrictive effect. When an AC voltage is applied, a vibration occurs in the multilayer capacitor in particular. If such a mechanical strain is generated when the multilayer capacitor is mounted on a board or the like, sounding will occur in the board due to the propagation of vibrations caused by the strain.

The inventors conducted diligent studies about how to reduce the sounding occurring when mounting the multilayer capacitor to boards and the like. As a result, the inventors have found that the sounding occurs at the contact portion between the board or the like to which the multilayer capacitor is mounted and the multilayer capacitor, i.e., the contact portion between a land electrode or the like of the board and a terminal electrode of the multilayer capacitor. The inventors conducted further studies based on this discovery and, as a result, have found a new fact that suppressing the electric field applied to an area in the vicinity of a terminal electrode in the element body can restrain the mechanical strain of the element body caused by the electrostrictive effect from affecting the terminal electrode.

In view of these results of studies, in one aspect, the present invention provides a multilayer capacitor comprising an element body having a substantially rectangular parallelepiped form made of a dielectric material; a plurality of inner electrodes arranged within the element body so as to oppose each other at least partly; and first, second, third, and fourth terminal electrodes arranged on the element body and connected to corresponding inner electrodes in the plurality of inner electrodes; wherein the element body has first and second side faces opposing each other while being parallel to a first direction in which the plurality of inner electrodes oppose each other, third and fourth side faces opposing each other while being continuous with the first and second side faces and parallel to the first direction, and fifth and sixth side faces opposing each other in the first direction while being continuous with the first to fourth side faces; wherein the first terminal electrode has an electrode part arranged so as to cover an edge part on the third side face side of the first side face and an edge part on the first side face side of the third side face; wherein the second terminal electrode has an electrode part arranged so as to cover an edge part on the fourth side face side of the first side face and an edge part on the first side face side of the fourth side face; wherein the third terminal electrode has an electrode part arranged so as to cover an edge part on the third side face side of the second side face and an edge part on the second side face side of the third side face; wherein the fourth terminal electrode has an electrode part arranged so as to cover an edge part on the fourth side face side of the second side face and an edge part on the second side face side of the fourth side face; and wherein an element part held between the plurality of inner electrodes in the element body is formed such as to overlap the electrode parts of the first to fourth terminal electrodes when seen in a second direction in which the first and second side faces oppose each other, overlap the electrode parts of the first to fourth terminal electrodes when seen in a third direction in which the third and fourth side faces oppose each other, and keep away from respective areas about the electrode parts of the first to fourth terminal electrodes when seen in the first direction.

The multilayer capacitor in accordance with this aspect of the present invention comprises an element body made of a dielectric material, a plurality of inner electrodes arranged within the element body, and first to fourth terminal electrodes arranged on the element body. The element body has an element part, while the element part is kept away from respective areas about the electrode parts of the first to fourth terminal electrodes when seen in the first direction. Therefore, each electrode part is separated from the element part. The element part is a portion held between the plurality of inner electrodes and thus causes the electrostrictive effect. However, since each electrode part is separated from the element part, the influence of the electrostrictive effect is alleviated between the electrode part and the element part. This can suppress mechanical strains caused by the electrostrictive effect near the first to fourth terminal electrodes.

Each electrode part and the element part overlap each other when seen in the second and third directions. Namely, in the element body, the element part is also formed in the areas held between the adjacent electrode parts and the areas held between the opposing electrode parts. Forming the element part not only in the center part of the element body but also in the above-mentioned areas makes it possible to fully secure the capacitance of the multilayer capacitor.

Preferably, in the multilayer capacitor in accordance with the present invention, the first to fourth terminal electrodes further include respective additional electrode parts continuous with the electrode parts and arranged on at least one of the fifth and sixth side faces, while the element part is formed such as to keep away from respective areas where the additional electrode parts of the first to fourth terminal electrodes are formed. Since the element part is formed such as to keep away from the areas formed with the additional electrode parts, the influence of the electrostrictive effect is alleviated between the element part and the additional electrode parts. This can suppress mechanical strains caused by the electrostrictive effect near the first to fourth terminal electrodes. Since the additional electrode parts are arranged on the fifth and sixth side faces, it becomes further easier to connect each terminal electrode to a land electrode of a board.

Preferably, when seen in the first direction, the element part in the multilayer capacitor in accordance with the present invention is formed such as to keep away from a first area defined by the electrode part of the first terminal electrode and a virtual line connecting both ends of the electrode part, a second area defined by the electrode part of the second terminal electrode and a virtual line connecting both ends of the electrode part, a third area defined by the electrode part of the third terminal electrode and a virtual line connecting both ends of the electrode part, and a fourth area defined by the electrode part of the fourth terminal electrode and a virtual line connecting both ends of the electrode part. Since the first to fourth areas exist between the element part and the electrode parts of the first to fourth terminal electrodes, the influence of the electrostrictive effect is alleviated in the first to fourth areas. This can suppress mechanical strains caused by the electrostrictive effect near the first to fourth terminal electrodes.

Preferably, when seen in the first direction, the element part in the multilayer capacitor in accordance with the present invention is formed in a substantially cross-shaped area excluding areas arranged with the additional electrode parts of the first to fourth terminal electrodes. In this case, the element part is reliably kept from being formed directly under the additional electrode parts, whereby the electrode parts and additional electrode parts can be separated from the element part more securely. As a result, mechanical strains caused by the electrostrictive effect near the first to fourth terminal electrodes can be suppressed more reliably. Also, the element part is formed securely in the area held by the terminal electrodes, whereby a sufficient capacitance can be obtained more reliably.

Preferably, when seen in the first direction, the element part in the multilayer capacitor in accordance with the present invention is formed in a substantially cross-shaped area excluding the first to fourth areas. In this case, the element part is reliably kept from being formed directly under the first to fourth areas, whereby areas formed with the electrode parts can be separated from the element part more securely. As a result, mechanical strains caused by the electrostrictive effect near the first to fourth terminal electrodes can be suppressed more reliably. Also, the element part is formed securely in the area held by the terminal electrodes as well, whereby a sufficient capacitance can be obtained reliably.

In another aspect, the present invention provides a multilayer capacitor comprising an element body having a substantially rectangular parallelepiped form made of a dielectric material; a plurality of inner electrodes arranged within the element body so as to oppose each other at least partly; and first, second, third, fourth, fifth, sixth, seventh, and eighth terminal electrodes arranged on the element body and connected to corresponding inner electrodes in the plurality of inner electrodes; wherein the element body has first and second side faces opposing each other while being parallel to a first direction in which the plurality of inner electrodes oppose each other, third and fourth side faces opposing each other while being continuous with the first and second side faces and parallel to the first direction, and fifth and sixth side faces opposing each other in the first direction while being continuous with the first to fourth side faces; wherein the first terminal electrode has an electrode part arranged on an edge part on the third side face side of the first side face; wherein the second terminal electrode has an electrode part arranged on an edge part on the fourth side face side of the first side face; wherein the third terminal electrode has an electrode part arranged on an edge part on the third side face side of the second side face; wherein the fourth terminal electrode has an electrode part arranged on an edge part on the fourth side face side of the second side face; wherein the fifth terminal electrode has an electrode part arranged on an edge part on the first side face side of the third side face; wherein the sixth terminal electrode has an electrode part arranged on an edge part on the first side face side of the fourth side face; wherein the seventh terminal electrode has an electrode part arranged on an edge part on the second side face side of the third side face; and wherein the eighth terminal electrode has an electrode part arranged on an edge part on the second side face side of the fourth side face; and wherein the element part held between the plurality of inner electrodes in the element body is formed such as to overlap the electrode parts of the first to fourth terminal electrodes when seen in a second direction in which the first and second side faces oppose each other, overlap the electrode parts of the fifth to eighth terminal electrodes when seen in a third direction in which the third and fourth side faces oppose each other, and keep away from respective areas about the electrode parts of the first to eighth terminal electrodes when seen in the first direction.

The multilayer capacitor in accordance with this aspect of the present invention comprises an element body made of a dielectric material, a plurality of inner electrodes arranged within the element body, and first to eighth terminal electrodes arranged on the element body. The element body has an element part, while the element part is kept away from respective areas about the electrode parts of the first to eighth terminal electrodes when seen in the first direction. Therefore, the area formed with each electrode part is separated from the element part. The element part is a portion held between the plurality of inner electrodes and thus causes the electrostrictive effect. However, since each electrode part is separated from the element part, the influence of the electrostrictive effect is alleviated between the electrode part and the element part. Therefore, mechanical strains caused by the electrostrictive effect near the first to eighth terminal electrodes can be suppressed.

Each electrode part and the element part overlap each other when seen in the second and third directions. Namely, in the element body, the element part is also formed in the areas held between the adjacent electrode parts and the areas held between the opposing electrode parts. Forming the element part not only in the center part of the element body but also in the above-mentioned areas makes it possible to fully secure the capacitance of the multilayer capacitor.

The present invention can provide a multilayer capacitor which can suppress mechanical strains caused by the electrostrictive effect near terminal electrodes in an element body made of a dielectric material.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals or letters while omitting their overlapping descriptions.

First Embodiment

Figure 1:
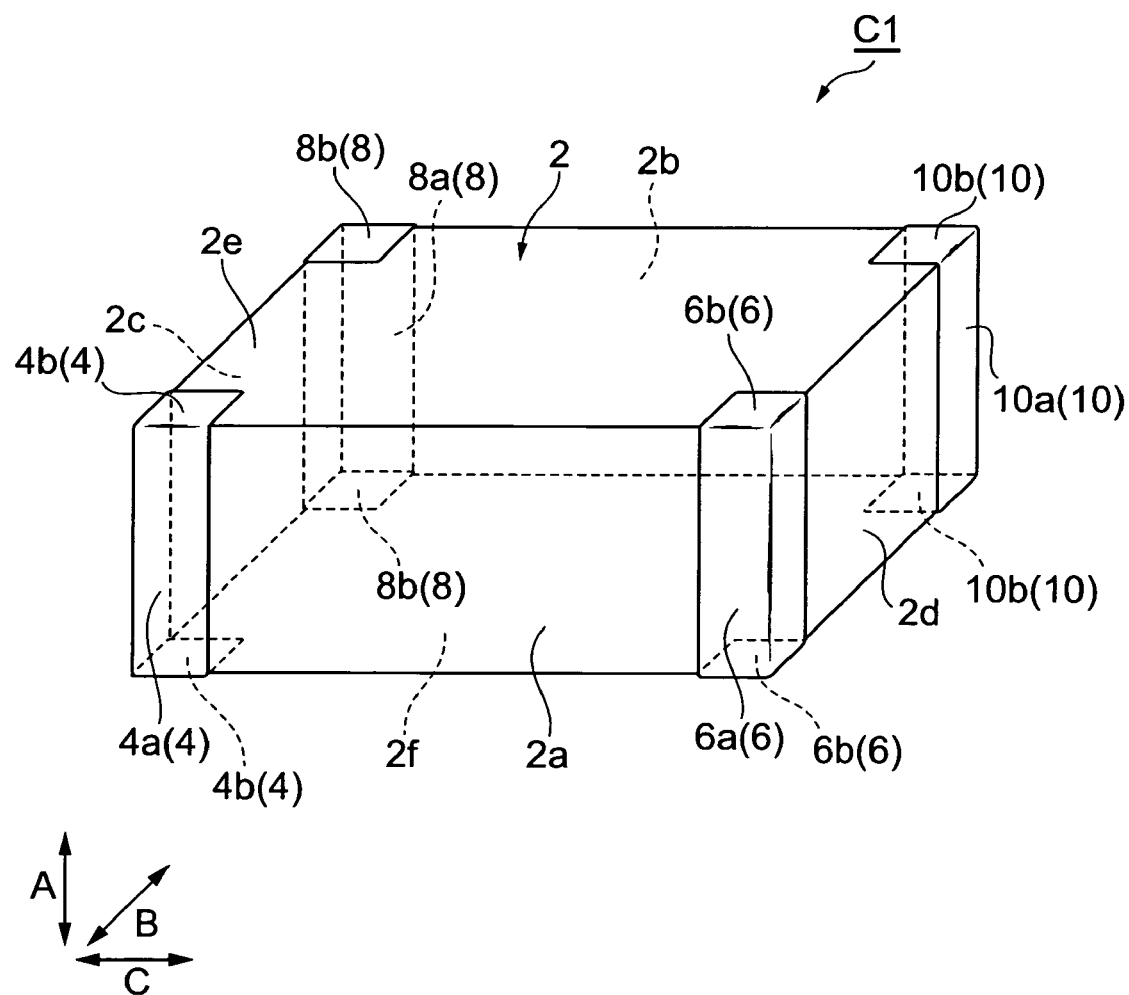
FIG. 1 is a perspective view of the multilayer capacitor in accordance with a first embodiment.
Figure 2:
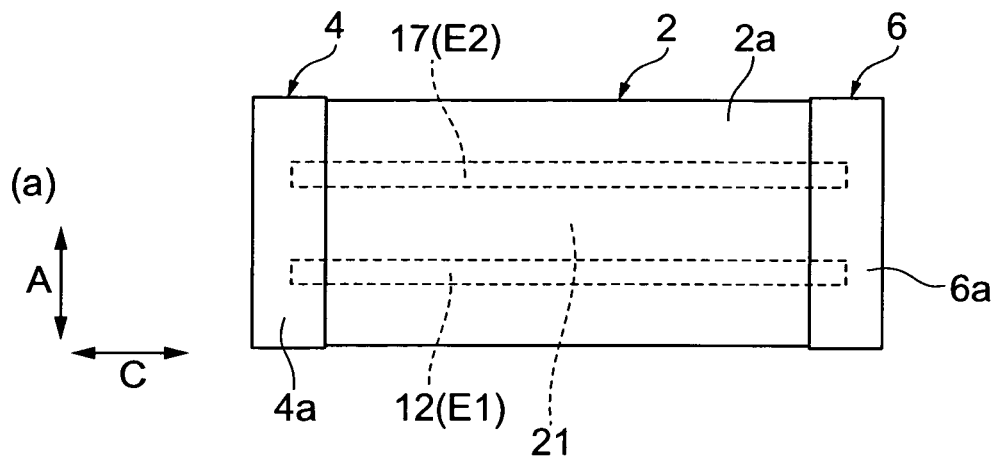
FIG. 2 is a side view of the multilayer capacitor in accordance with the first embodiment.
Figure 2:
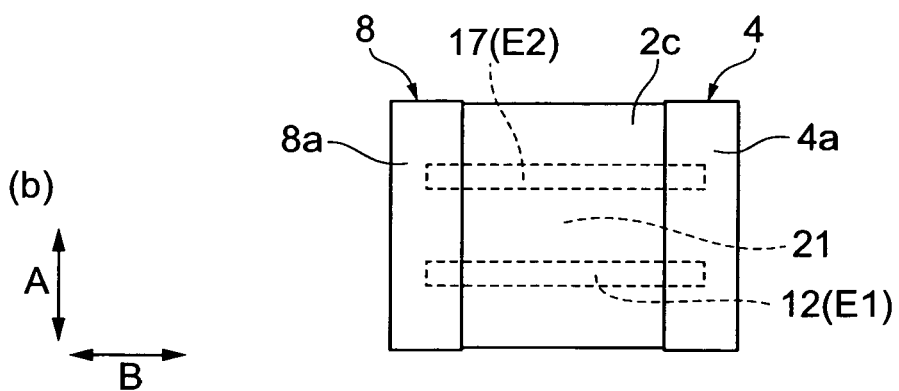
Figure 2:
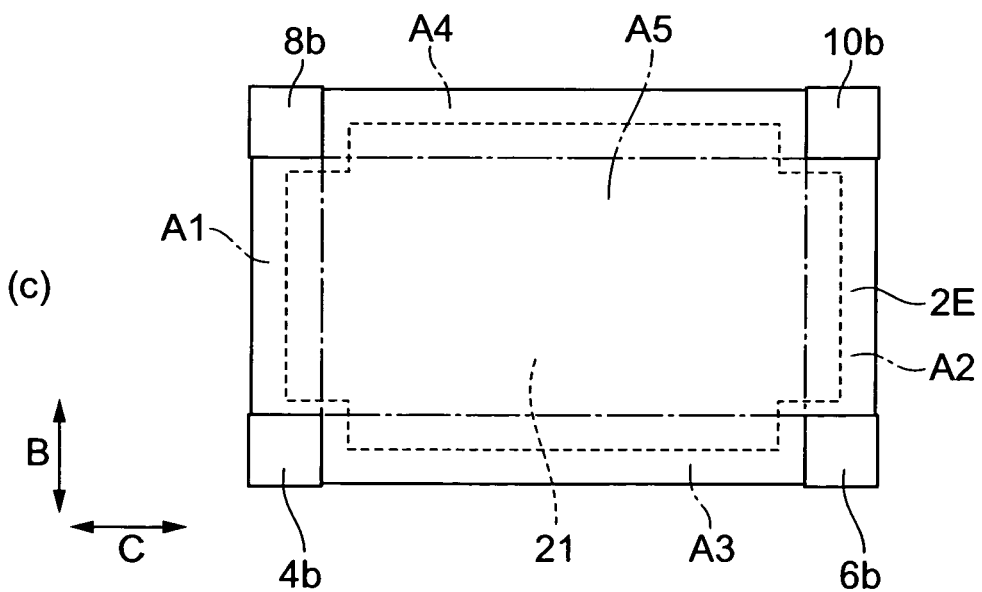
Figure 3:
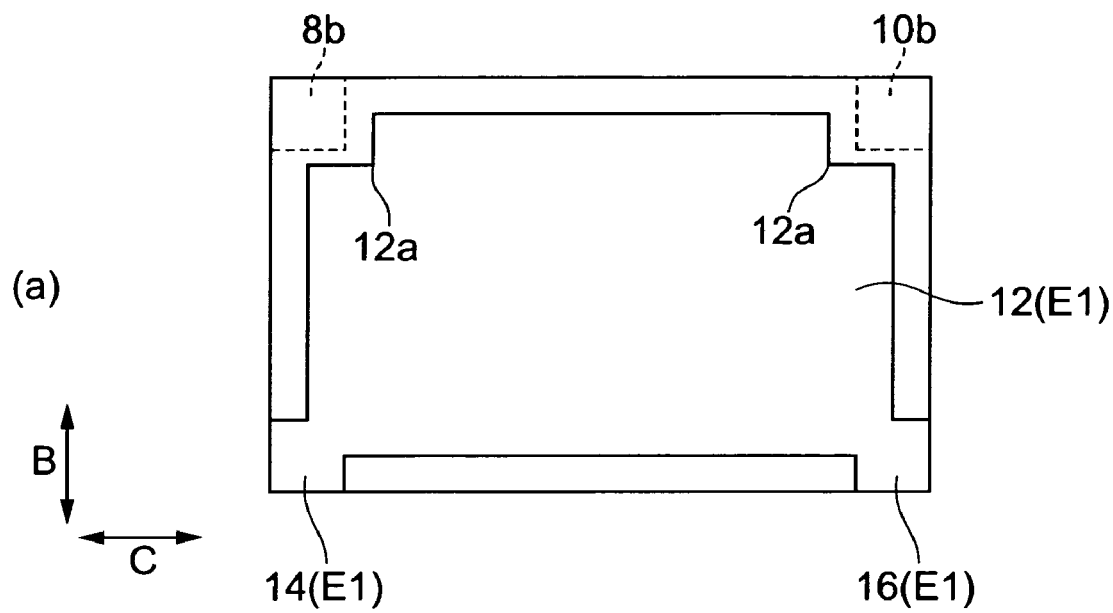
FIG. 3 is a sectional view of the multilayer capacitor in accordance with the first embodiment.
Figure 3:
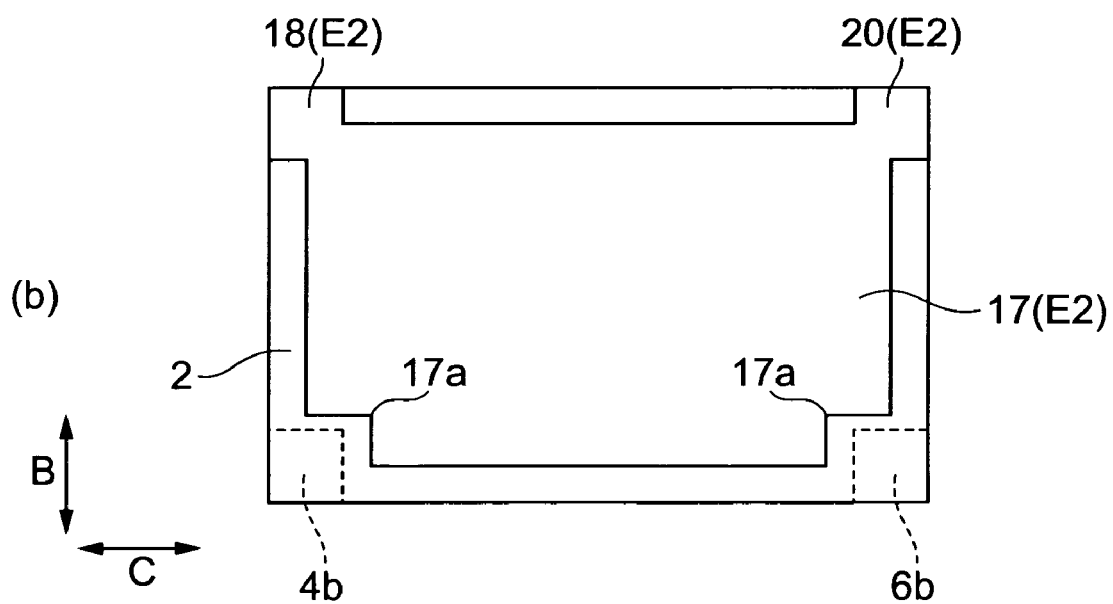

With reference to FIGS. 1 and 2, the structure of the multilayer capacitor C1 in accordance with the first embodiment will be explained. FIG. 1 is a perspective view of the multilayer capacitor in accordance with this embodiment. FIG. 2 is a side view of the multilayer capacitor in accordance with this embodiment. FIG. 3 is a sectional view of the multilayer capacitor in accordance with this embodiment. The cross-sectional hatching is omitted in FIG. 3.

As shown in FIGS. 1 to 3, the multilayer capacitor C1 comprises a capacitor element (element body) 2, a plurality of (2 in this embodiment) inner electrodes E1, E2, a first terminal electrode 4, a second terminal electrode 6, a third terminal electrode 8, and a fourth terminal electrode 10.

The capacitor element 2 has a substantially rectangular parallelepiped form. The capacitor element 2 has a first side face 2a and a second side face 2b which oppose each other while being parallel to an arrowed direction A (first direction). The capacitor element 2 has a third side face 2c and a fourth side face 2d which oppose each other and continue with the first and second side faces 2a, 2b. The third side face 2c and fourth side face 2d are surfaces parallel to the arrowed direction A. The capacitor element 2 has a fifth side face 2e and a sixth side face 2f which oppose each other in the arrowed direction A and continue with the first to fourth side faces 2a to 2d. The arrowed direction A indicates the direction in which the inner electrodes E1, E2 oppose each other. An arrowed direction B (second direction) indicates the direction in which the first and second side faces 2a, 2b oppose each other. An arrowed direction C (third direction) indicates the direction in which the third and fourth side faces 2c, 2d oppose each other.

On the capacitor element 2, as shown in FIG. 1, the first terminal electrode 4 is arranged over the first, third, fifth, and sixth side faces 2a, 2c, 2e, 2f. On the capacitor element 2, the second terminal electrode 6 is arranged over the first, fourth, fifth, and sixth side faces 2a, 2d, 2e, 2f. On the capacitor element 2, the third terminal electrode 8 is arranged over the second, third, fifth, and sixth side faces 2b, 2c, 2e, 2f. On the capacitor element 2, the fourth terminal electrode 10 is arranged over the second, fourth, fifth, and sixth side faces 2b, 2d, 2e, 2f. The first terminal electrode 4 has electrode parts 4a, 4b. The second terminal electrode 6 has electrode parts 6a, 6b. The third terminal electrode 8 has electrode parts 8a, 8b. The fourth terminal electrode 10 has electrode parts 10a, 10b. The first to fourth terminal electrodes 4, 6, 8, 10 are formed, for example, by attaching and burning a conductive paste, which contains a conductive metal powder and a glass frit, onto their corresponding outer surfaces of the capacitor element 2. A plating layer may be formed on the burned electrodes when necessary.

The electrode part 4a of the first terminal electrode 4 is arranged so as to cover an edge part on the third side face 2c side of the first side face 2a and an edge part on the first side face 2a side of the third side face 2c. Namely, the electrode part 4a is formed at a ridge where the first and third side faces 2a, 2c meet. The electrode part 6a of the second terminal electrode 6 is arranged so as to cover an edge part on the fourth side face 2d side of the first side face 2a and an edge part on the first side face 2a side of the fourth side face 2d. Namely, the electrode part 6a is formed at a ridge where the first and fourth side faces 2a, 2d meet. The electrode part 8a of the third terminal electrode 8 is arranged so as to cover an edge part on the third side face 2c side of the second side face 2b and an edge part on the second side face 2b side of the third side face 2c. Namely, the electrode part 8a is formed at a ridge where the second and third side faces 2b, 2c meet. The electrode part 10a of the fourth terminal electrode 10 is arranged so as to cover an edge part on the fourth side face 2d side of the second side face 2b and an edge part on the second side face 2b side of the fourth side face 2d. Namely, the electrode part 10a is formed at a ridge where the second and fourth side faces 2b, 2d meet.

The electrode part (additional electrode part) 4b of the first terminal electrode 4 is continuous with the electrode part 4a. The electrode part (additional electrode part) 6b of the second terminal electrode 6 is continuous with the electrode part 6a. The electrode part (additional electrode part) 8b of the third terminal electrode 8 is continuous with the electrode part 8a. The electrode part (additional electrode part) 10b of the fourth terminal electrode 10 is continuous with the electrode part 10a. The electrode parts 4b, 6b, 8b, 10b are arranged on the fifth and sixth side faces 2e, 2f of the capacitor element 2.

The capacitor element 2 is made of a dielectric material. As shown in FIG. 2, the inner electrodes E1, E2 are arranged within the capacitor element 2. More specifically, in the capacitor element 2, the inner electrodes E1, E2 are laminated while holding therebetween a dielectric layer which is not depicted. The undepicted dielectric layer is constituted by a sintered body of a ceramic green sheet containing a dielectric ceramic, for example. The inner electrodes E1, E2 are constituted by sintered bodies of a conductive paste.

As shown in FIG. 3(a), the inner electrode E1 includes a main electrode part 12 and lead electrode parts 14, 16. The main electrode part 12 is provided with a pair of cutouts 12a. The positions of the cutouts 12a correspond to the positions where the electrode parts 4b, 6b of the first and second terminal electrodes 4, 6 are formed. The lead electrode part 14 extends from the main electrode part 12, so as to be drawn to the ridge where the first and third side faces 2a, 2c meet. The lead electrode part 14 is electrically and physically connected to the first terminal electrode 4. The lead electrode part 16 extends from the main electrode part 12, so as to be drawn to the ridge where the first and fourth side faces 2a, 2d meet. The lead electrode part 16 is electrically and physically connected to the second terminal electrode 6.

As shown in FIG. 3(b), the inner electrode E2 includes a main electrode part 17 and lead electrode parts 18, 20. The main electrode part 17 is provided with a pair of cutouts 17a. The positions of the cutouts 17a correspond to the positions where the electrode parts 8b, 10b of the third and fourth terminal electrodes 8, 10 are formed. The lead electrode part 18 extends from the main electrode part 17, so as to be drawn to the ridge where the second and third side faces 2b, 2c meet. The lead electrode part 18 is electrically and physically connected to the third terminal electrode 8. The lead electrode part 20 extends from the main electrode part 17, so as to be drawn to the ridge where the second and fourth side faces 2b, 2d meet. The lead electrode part 20 is electrically and physically connected to the fourth terminal electrode 10.

The inner electrodes E1, E2 are arranged such that the main electrode part 12 of the inner electrode E1 and the main electrode part 17 of the inner electrode E2 overlay each other when seen in the arrowed direction A shown in FIG. 1. Consequently, a portion held between the main electrode part 12 of the inner electrode E1 and the main electrode part 17 of the inner electrode E2 exists in the capacitor element 2. This portion will hereinafter be referred to as element part 21

As shown in FIG. 2(c), when seen from the fifth side face 2e side, the element part 21 is formed such as to keep away from areas where the electrode parts 4b, 6b, 8b, 10b of the first to fourth terminal electrodes 4, 6, 8, 10 are formed. Though FIG. 2(c) is a view showing the multilayer capacitor C1 as seen from the fifth side face 2e side, the element part 21 is formed such as to keep away from areas about the electrode parts 4b, 6b, 8b, 10b of the first to fourth terminal electrodes 4, 6, 8, 10 when seen from the sixth side face 2f side as well. Namely, the element part 21 is formed such as to keep away from the electrode parts 4b, 6b, 8b, 10b when seen in the arrowed direction A.

The element part 21 as seen in the arrowed direction A will now be explained in further detail. The element part 21 is formed into a substantially cross-shaped area excluding the areas arranged with the electrode parts 4b, 6b, 8b, 10b. The substantially cross-shaped area is constituted by an area A1 held between the electrode parts 4b and 8b, an area A2 held between the electrode parts 6b and 10b, an area A3 held between the electrode parts 4b and 6b, an area A4 held between the electrode parts 8b and 10b, and an area A5 surrounded by the areas A1 to A4. The element part 21 is formed such as to extend to all the areas A1 to A5 and has a substantially cross-shaped form. When seen in the arrowed direction A, the element part 21 is kept from overlapping the electrode parts 4b, 6b, 8b, 10b.

The element part 21 exhibiting a substantially cross-shaped form when seen in the arrowed direction A overlaps the electrode parts 4a, 6a of the first and second terminal electrodes 4, 6 when seen from the first side face 2a side as shown in FIG. 2(a). While FIG. 2(a) is a view showing the multilayer capacitor C1 as seen from the first side face 2a side, the element part 21 overlaps the electrode parts 8a, 10a of the third and fourth terminal electrodes 8, 10 when seen from the second side face 2b side. Namely, the element part 21 overlaps the electrode parts 4a, 6a, 8a, 10a when seen in the arrowed direction B.

The element part 21 exhibiting a substantially cross-shaped form when seen in the arrowed direction A overlaps the electrode parts 4a, 8a of the first and third terminal electrodes 4, 8 when seen from the third side face 2c side as shown in FIG. 2(b). While FIG. 2(b) is a view showing the multilayer capacitor C1 as seen from the third side face 2c side, the element part 21 overlaps the electrode parts 6a, 10a of the second and fourth terminal electrodes 6, 10 when seen from the fourth side face 2d side. Namely, the element part 21 overlaps the electrode parts 4a, 6a, 8a, 10a when seen in the arrowed direction C.

Operations of thus constructed multilayer capacitor C1 will now be explained. When the first to fourth terminal electrodes 4, 6, 8, 10 are connected to land electrodes or the like of a board, and a voltage is applied to the inner electrodes E1, E2 through the first to fourth terminal electrodes 4, 6, 8, 10, the electrostrictive effect occurs in the element part 21 held between the main electrode part 12 of the inner electrode E1 and the main electrode part 17 of the inner electrode E2. The element part 21 is formed into a substantially cross-shaped area excluding the areas arranged with the electrode parts 4b, 6b, 8b, 10b when seen in the arrowed direction A.

Therefore, the element part 21 does not exist directly under the electrode parts 4b, 6b, 8b, 10b and is accordingly separated from the electrode parts 4a, 6a, 8a, 10a, 4b, 6b, 8b, 10b. The influence of the electrostrictive effect generated in the element part 21 is alleviated between the element part 21 and the electrode parts 4a, 6a, 8a, 10a, 4b, 6b, 8b, 10b. As a result, the electrode parts 4a, 6a, 8a, 10a, 4b, 6b, 8b, 10b are hard to be affected by the electrostrictive effect. Thus, the multilayer capacitor C1 in accordance with this embodiment can suppress mechanical strains caused by the electrostrictive effect near the first to fourth terminal electrodes 4, 6, 8, 10. This can reduce the possibility of the first to fourth terminal electrodes 4, 6, 8, 10 being pulled by the distorted capacitor element 2.

Therefore, when a voltage is applied to the multilayer capacitor C1 mounted to a board or the like, the sounding occurring in the board or the like is suppressed.

In the multilayer capacitor C1, the element part 21 is formed in all the areas A1 to A4 held by the electrode parts 4b, 6b, 8b, 10b. Since the element part 21 is formed not only in the center part of the capacitor element 2 but also in the areas A1 to A4, a sufficient capacitance can be secured.

The electrode parts in the multilayer capacitor C1 are formed in an area narrower than that in a case where the electrode parts are formed such as to cover the first and second side faces 2a, 2b (or third and fourth side faces 2c, 2d) of the capacitor element 2 as a whole. Therefore, even if the first to fourth terminal electrodes 4, 6, 8, 10 are pulled by the capacitor element 2 distorted by the electrostrictive effect, the influence on a board or the like mounting -the multilayer capacitor C1 can be reduced. Further, since all of the first to sixth side faces 2a to 2f are arranged with the electrode parts in the multilayer capacitor C1, it becomes easy to connect the multilayer capacitor C1 to land electrodes of the board.

Second Embodiment

Figure 4:
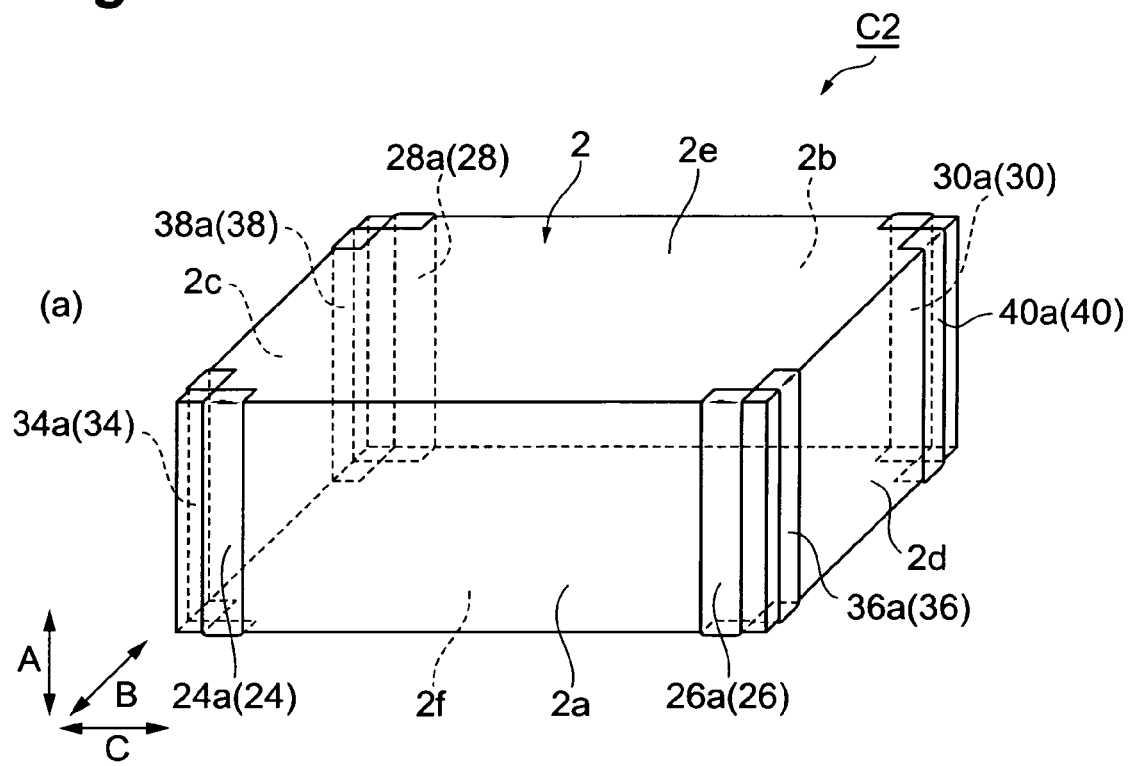
FIG. 4 is a perspective and top plan view of the multilayer capacitor in accordance with a second embodiment.
Figure 4:
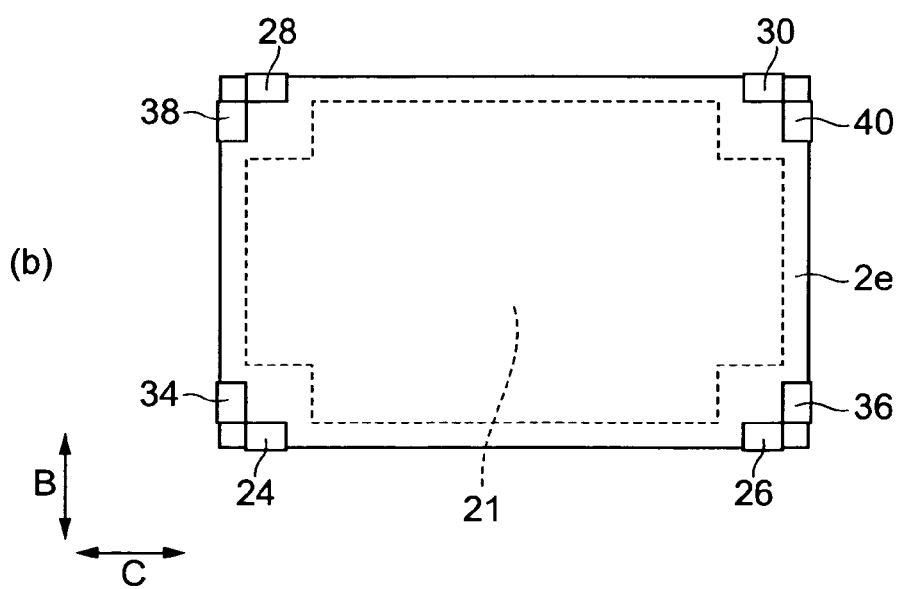

With reference to FIG. 4, the multilayer capacitor in accordance with the second embodiment will now be explained. The multilayer capacitor in accordance with the second embodiment differs from the multilayer capacitor C1 in accordance with the first embodiment in terms of positions of terminal electrodes. FIG. 4 is a view showing the multilayer capacitor in accordance with this embodiment, in which FIGS. 4(a) and 4(b) are perspective and top plan views, respectively.

The multilayer capacitor C2 in accordance with the second embodiment comprises a capacitor element 2 and inner electrodes E1, E2. The multilayer capacitor C2 includes a first terminal electrode 24, a second terminal electrode 26, a third terminal electrode 28, a fourth terminal electrode 30, a fifth terminal electrode 34, a sixth terminal electrode 36, a seventh terminal electrode 38, and an eighth terminal electrode 40. The capacitor element 2 and inner electrodes E1, E2 have structures similar to those of the capacitor element 2 and inner electrodes E1, E2 of the multilayer capacitor C1 in accordance with the first embodiment.

As shown in FIG. 4(a), on the capacitor element 2, the first and second terminal electrodes 24, 26 are arranged over the first, fifth, and sixth side faces 22a, 22e, 22f. The third and fourth terminal electrodes 28, 30 are arranged over the second, fifth, and sixth side faces 22b, 22e, 22f. The fifth and seventh terminal electrodes 34, 38 are arranged over the third, fifth, and sixth side faces 22c, 22e, 22f. The sixth and eighth terminal electrodes 36, 40 are arranged over the fourth, fifth, and sixth side faces 22d, 22e, 22f. The first, second, third, fourth, fifth, sixth, seventh, and eighth terminal electrodes 24, 26, 28, 30, 34, 36, 38, 40 have electrode parts 24a, 26a, 28a, 30a, 34a, 36a, 38a, respectively. Materials and methods for forming the first to eighth terminal electrodes 24, 26, 28, 30, 34, 36, 38, 40 are similar to those of the first to fourth terminal electrodes 4, 6, 8, 10 of the multilayer capacitor C1 in accordance with the first embodiment.

The electrode part 24a of the first terminal electrode 24 is arranged on an edge part on the third side face 2c side of the first side face 2a. The electrode part 26a of the second terminal electrode 26 is arranged on an edge part on the fourth side face 2d side of the first side face 2a. The electrode part 28a of the third terminal electrode 28 is arranged on an edge part on the third side face 2c side of the second side face 2b. The electrode part 30a of the fourth terminal electrode 30 is arranged on an edge part on the fourth side face 2d side of the second side face 2b. The electrode part 34a of the fifth terminal electrode 34 is arranged on an edge part on the first side face 2a side of the third side face 2c. The electrode part 36a of the sixth terminal electrode 36 is arranged on an edge part on the first side face 2a side of the fourth side face 2d. The electrode part 38a of the seventh terminal electrode 38 is arranged on an edge part on the second side face 2b side of the third side face 2c. The electrode part 40a of the eighth terminal electrode 40 is arranged on an edge part on the second side face 2b side of the fourth side face 2d.

Thus, the electrode parts 24a, 26a, 28a, 30a, 34a, 36a, 38a, 40a are arranged at edge parts of the first to sixth side faces 2a to 2f. On the other hand, the element part 21 of the capacitor element 2 is substantially shaped like a cross as mentioned in the first embodiment. Therefore, it can be said that the element part 21 in the multilayer capacitor C2 is formed such as to keep away from the electrode parts 24a, 26a, 28a, 30a, 34a, 36a, 38a, 40a when seen in the arrowed direction A as shown in FIG. 4(b). The element part 21 overlaps the first to fourth terminal electrodes 24a, 26a, 28a, 30a when seen in the arrowed direction B, and overlaps the fifth to eighth terminal electrodes 34a, 36a, 38a, 40a when seen in the arrowed direction C.

In thus constructed multilayer capacitor C2, the electrostrictive effect occurs in the element part 21 when a voltage is applied to the inner electrodes E1, E2 through the first to eighth terminal electrodes 24, 26, 28, 30, 34, 36, 38, 40. When seen in the arrowed direction A, the element part 21 is formed such as to keep away from the electrode parts 24a, 26a, 28a, 30a, 34a, 36a, 38a, 40a. Therefore, the element part 21 does not exist about these electrode parts. Hence, the element part 21 is separated from the electrode parts 24a, 26a, 28a, 30a, 34a, 36a, 38a, 40a. The influence of the electrostrictive effect generated in the element part 21 is alleviated between the element part 21 and the electrode parts 24a, 26a, 28a, 30a, 34a, 36a, 38a, 40a. As a result, the electrode parts 24a, 26a, 28a, 30a, 34a, 36a, 38a, 40a are hard to be affected by the electrostrictive effect. Thus, the multilayer capacitor C2 in accordance with this embodiment can suppress mechanical strains caused by the electrostrictive effect near the first to eighth terminal electrodes 24, 26, 28, 30, 34, 36, 38, 40. This can reduce the possibility of the terminal electrodes being pulled by the distorted capacitor element 2.

Therefore, when a voltage is applied to the multilayer capacitor C2 mounted to a board or the like, the sounding occurring in the board or the like is suppressed as in the multilayer capacitor C1 in accordance with the first embodiment.

Though preferred embodiments of the present invention are explained in the foregoing, the present invention is not necessarily limited to the above-mentioned embodiments and can be modified in various ways within the scope not deviating from the gist thereof.

For example, the number of laminations of inner electrodes is not limited to that shown in the above-mentioned embodiments.

Figure 5:
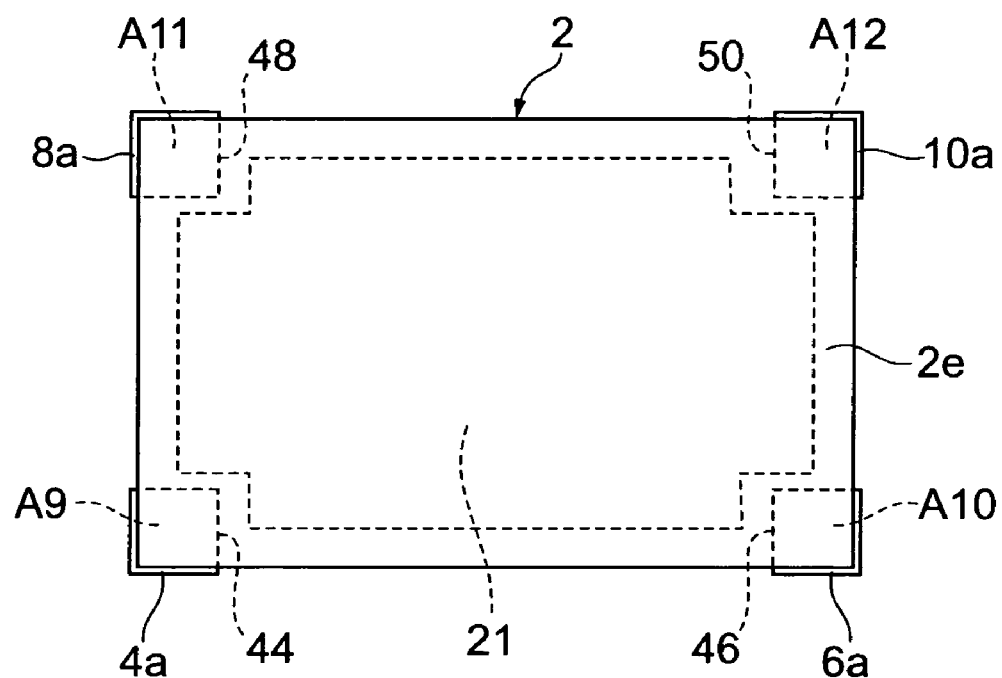
FIG. 5 is a top plan view of a modified example of the multilayer capacitor in accordance with the first embodiment.

Though the first to fourth terminal electrodes 4, 6, 8, 10 have the electrode parts 4b, 6b, 8b, 10b in the first embodiment, these electrode parts may be omitted. FIG. 5 is a top plan view showing a modified example of the multilayer capacitor C1. In the multilayer capacitor shown in FIG. 5, each of the first to fourth terminal electrodes 4, 6, 8, 10 is shaped like letter I. Namely, the first to fourth terminal electrodes 4, 6, 8, 10 have electrode parts 4a, 6a, 8a, 10a on the first to fourth side faces 2a to 2d, but not on the fifth and sixth side faces 2e, 2f. As this multilayer capacitor is seen in the arrowed direction A, the element part 21 is formed in a substantially cross-shaped area excluding areas A9 (first area), A10 (second area), A11 (third area), and A12 (fourth area). Namely, the element part 21 is formed such as to keep away from the areas A9 to A12. The area A9 is an area defined by the electrode part 4a and a virtual line 44 connecting both ends of the electrode part 4a. The area A10 is an area defined by the electrode part 6a and a virtual line 46 connecting both ends of the electrode part 6a. The area A11 is an area defined by the electrode part 8a and a virtual line 48 connecting both ends of the electrode part 8a. The area A12 is an area defined by the electrode part 10a and a virtual line 50 connecting both ends of the electrode part 10a. The element part 21 is separated from the electrode parts 4a, 6a, 8a, 10a in this case as well, whereby mechanical strains caused by the electrostrictive effect near the first to fourth terminal electrodes 4, 6, 8, 10 can be suppressed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
    an element body having a substantially rectangular parallelepiped form made of a dielectric material;
    a plurality of inner electrodes arranged within the element body so as to oppose each other at least partly; and
    first, second, third, and fourth terminal electrodes arranged on the element body and connected to corresponding inner electrodes in the plurality of inner electrodes;
    wherein the element body has first and second side faces opposing each other while being parallel to a first direction in which the plurality of inner electrodes oppose each other, third and fourth side faces opposing each other while being continuous with the first and second side faces and parallel to the first direction, and fifth and sixth side faces opposing each other in the first direction while being continuous with the first to fourth side faces;
    wherein the first terminal electrode has an electrode part arranged so as to cover an edge part on the third side face side of the first side face and an edge part on the first side face side of the third side face;
    wherein the second terminal electrode has an electrode part arranged so as to cover an edge part on the fourth side face side of the first side face and an edge part on the first side face side of the fourth side face;
    wherein the third terminal electrode has an electrode part arranged so as to cover an edge part on the third side face side of the second side face and an edge part on the second side face side of the third side face;
    wherein the fourth terminal electrode has an electrode part arranged so as to cover an edge part on the fourth side face side of the second side face and an edge part on the second side face side of the fourth side face; and wherein an element part held between the plurality of inner electrodes in the element body is formed such as to overlap the electrode parts of the first to fourth terminal electrodes when seen in a second direction in which the first and second side faces oppose each other, overlap the electrode parts of the first to fourth terminal electrodes when seen in a third direction in which the third and fourth side faces oppose each other, and keep away from respective areas about the electrode parts of the first to fourth terminal electrodes when seen in the first direction.

2. A multilayer capacitor according to claim 1, wherein the first to fourth terminal electrodes further include respective additional electrode parts continuous with the electrode parts and arranged on at least one of the fifth and sixth side faces; and wherein the element part is formed such as to keep away from respective areas where the additional electrode parts of the first to fourth terminal electrodes are formed.

3. A multilayer capacitor according to claim 1, wherein, when seen in the first direction, the element part is formed such as to keep away from a first area defined by the electrode part of the first terminal electrode and a virtual line connecting both ends of the electrode part, a second area defined by the electrode part of the second terminal electrode and a virtual line connecting both ends of the electrode part, a third area defined by the electrode part of the third terminal electrode and a virtual line connecting both ends of the electrode part, and a fourth area defined by the electrode part of the fourth terminal electrode and a virtual line connecting both ends of the electrode part.

4. A multilayer capacitor according to claim 2, wherein, when seen in the first direction, the element part is formed in a substantially cross-shaped area excluding areas arranged with the additional electrode parts of the first to fourth terminal electrodes.

5. A multilayer capacitor according to claim 3, wherein, when seen in the first direction, the element part is formed in a substantially cross-shaped area excluding the first to fourth areas.

6. A multilayer capacitor comprising:

an element body having a substantially rectangular parallelepiped form made of a dielectric material;

a plurality of inner electrodes arranged within the element body so as to oppose each other at least partly; and first, second, third, fourth, fifth, sixth, seventh, and eighth terminal electrodes arranged on the element body and connected to corresponding inner electrodes in the plurality of inner electrodes;

wherein the element body has first and second side faces opposing each other while being parallel to a first direction in which the plurality of inner electrodes oppose each other, third and fourth side faces opposing each other while being continuous with the first and second side faces and parallel to the first direction, and fifth and sixth side faces opposing each other in the first direction while being continuous with the first to fourth side faces;

wherein the first terminal electrode has an electrode part arranged on an edge part on the third side face side of the first side face;

wherein the second terminal electrode has an electrode part arranged on an edge part on the fourth side face side of the first side face;

wherein the third terminal electrode has an electrode part arranged on an edge part on the third side face side of the second side face;

wherein the fourth terminal electrode has an electrode part arranged on an edge part on the fourth side face side of the second side face;

wherein the fifth terminal electrode has an electrode part arranged on an edge part on the first side face side of the third side face;

wherein the sixth terminal electrode has an electrode part arranged on an edge part on the first side face side of the fourth side face;

wherein the seventh terminal electrode has an electrode part arranged on an edge part on the second side face side of the third side face; and wherein the eighth terminal electrode has an electrode part arranged on an edge part on the second side face side of the fourth side face; and wherein the element part held between the plurality of inner electrodes in the element body is formed such as to overlap the electrode parts of the first to fourth terminal electrodes when seen in a second direction in which the first and second side faces oppose each other, overlap the electrode parts of the fifth to eighth terminal electrodes when seen in a third direction in which the third and fourth side faces oppose each other, and keep away from respective areas about the electrode parts of the first to eighth terminal electrodes when seen in the first direction.

* * * * *

UNITED STATES PATENT AND TRADEMARK OFFICE
CERTIFICATE OF CORRECTION

| | |
|---|---|
| PATENT NO. | : 7,495,885 B2 |
| APPLICATION NO. | : 12/007829 |
| DATED | : February 24, 2009 |
| INVENTOR(S) | : Masaaki Togashi et al. |

It is certified that error appears in the above-identified patent and that said Letters Patent is hereby corrected as shown below:

On the cover page, item (73) Assignee:
change: "TDI Corporation, Tokyo (JP)"
to: --TDK Corporation, Tokyo (JP)--

Signed and Sealed this
Twelfth Day of July, 2011

David J. Kappos
*Director of the United States Patent and Trademark Office*